(12) United States Patent
Bennis

(10) Patent No.: US 6,425,200 B1
(45) Date of Patent: Jul. 30, 2002

(54) TWO-STAGE FISHING BOBBER

(76) Inventor: Gary L. Bennis, 515 Pitt St., Eau Claire, WI (US) 54703

( * ) Notice: Subject to any disclaimer, the term of this patent is extended or adjusted under 35 U.S.C. 154(b) by 0 days.

(21) Appl. No.: 09/592,460

(22) Filed: Jun. 9, 2000

(51) Int. Cl.$^7$ .............................................. A01K 93/02
(52) U.S. Cl. ..................................... 43/44.91; 43/44.87
(58) Field of Search ............................. 43/44.9, 44.91, 43/44.87, 44.92, 44.95

(56) References Cited

U.S. PATENT DOCUMENTS

| | | | | |
|---|---|---|---|---|
| 862,853 A | * | 8/1907 | Simmons ................... | 43/44.91 |
| 1,982,573 A | | 11/1934 | Coyne ........................ | 43/49 |
| 2,181,458 A | * | 11/1939 | La Gue ...................... | 43/44.92 |
| 2,208,240 A | * | 7/1940 | Arnesen et al. ............ | 43/44.91 |
| 2,239,911 A | * | 4/1941 | Dorn ......................... | 43/44.92 |
| 2,374,752 A | * | 5/1945 | Johnson ..................... | 43/44.87 |
| 2,493,971 A | * | 1/1950 | Johnson ..................... | 43/44.91 |
| 2,509,704 A | * | 5/1950 | Streitwieser ............... | 43/44.91 |
| 2,609,634 A | | 9/1952 | Simpson .................... | 43/44.88 |
| 2,631,399 A | | 3/1953 | Sowa ......................... | 43/15 |
| 2,712,194 A | | 7/1955 | Di Stefano ................. | 43/15 |
| 4,359,836 A | | 11/1982 | Yuji ........................... | 43/44.9 |
| 5,117,576 A | | 6/1992 | Lasiter ....................... | 43/44.9 |
| 5,243,780 A | * | 9/1993 | Christensen ............... | 43/44.87 |
| 5,608,985 A | | 3/1997 | Kainec ....................... | 43/43.1 |
| 5,784,829 A | * | 7/1998 | Latta ......................... | 43/44.91 |
| 6,009,659 A | * | 1/2000 | Shannon et al. ........... | 43/44.91 |

* cited by examiner

*Primary Examiner*—Kurt Rowan
(74) *Attorney, Agent, or Firm*—Jacobson & Johnson

(57) ABSTRACT

A two-stage fising bobber including a bobber main body normally buoyable in a body of water with the bobber main body having an opening extending through a vertical float axis of the bobber main body and a slideable rod slidably positioned in the cavity of the bobber main body with the slideable rod normally resiliently maintained in the bobber main body in an up position but downwardly displaceable with respect to the bobber main body in response to a first force on the fishing line which is sufficient to displace the slideable rod with respect to the bobber main body but not sufficient for a viewer to discern the displacement of the bobber main body with respect to the body of water to thereby provide a first-stage visually indication. The bobber main body and the slideable rod both displaceable into the body of water in response to a second force larger than the first force to thereby provide a second-stage visual indication.

16 Claims, 5 Drawing Sheets

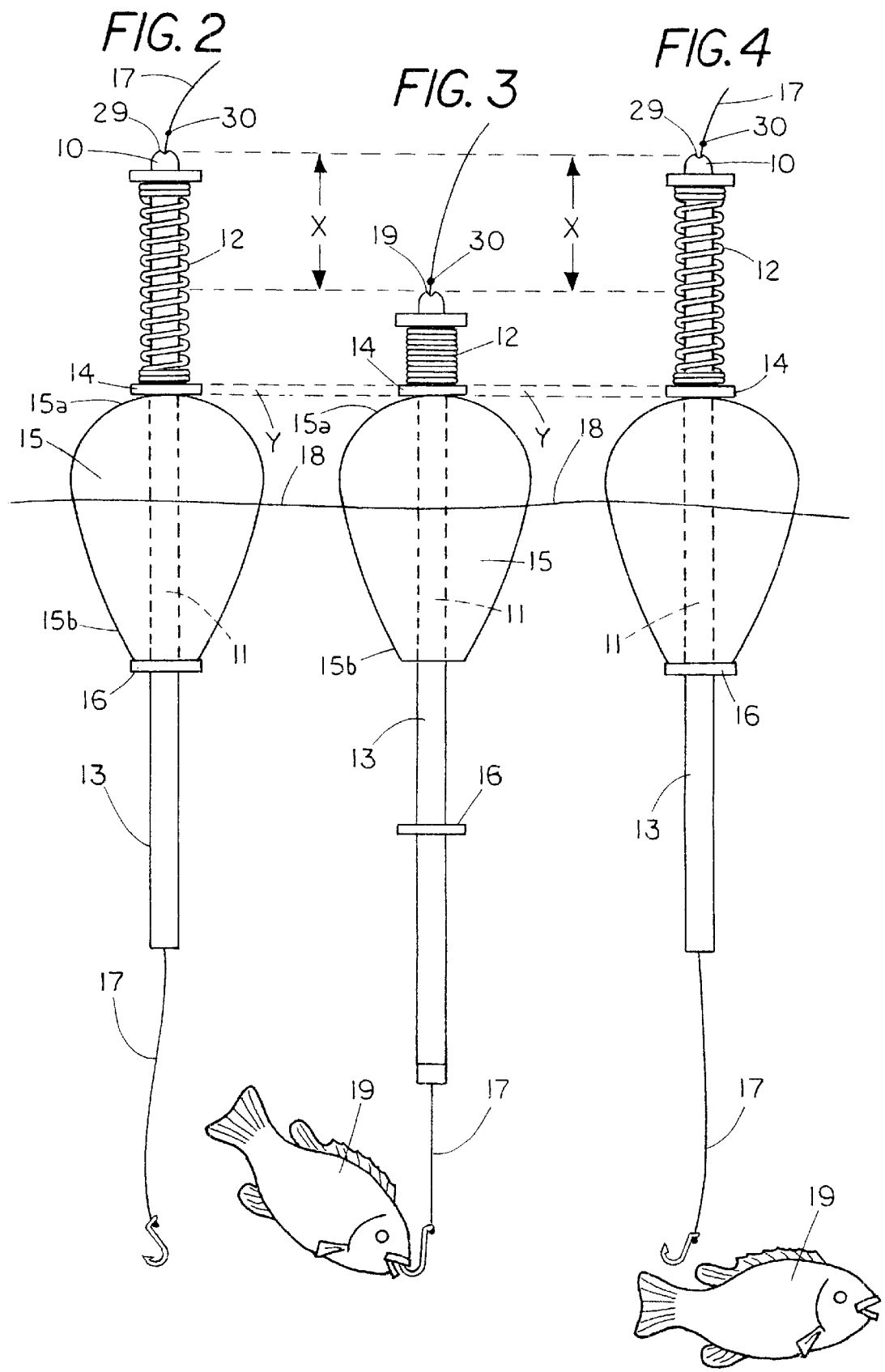

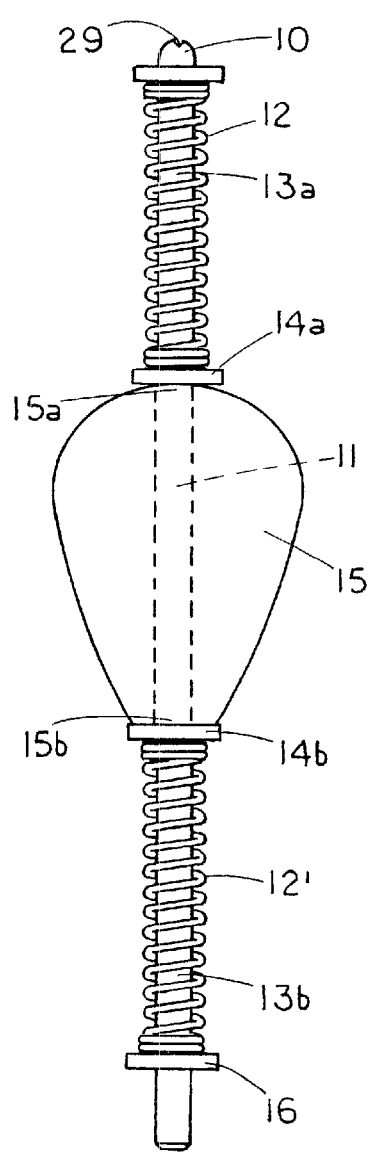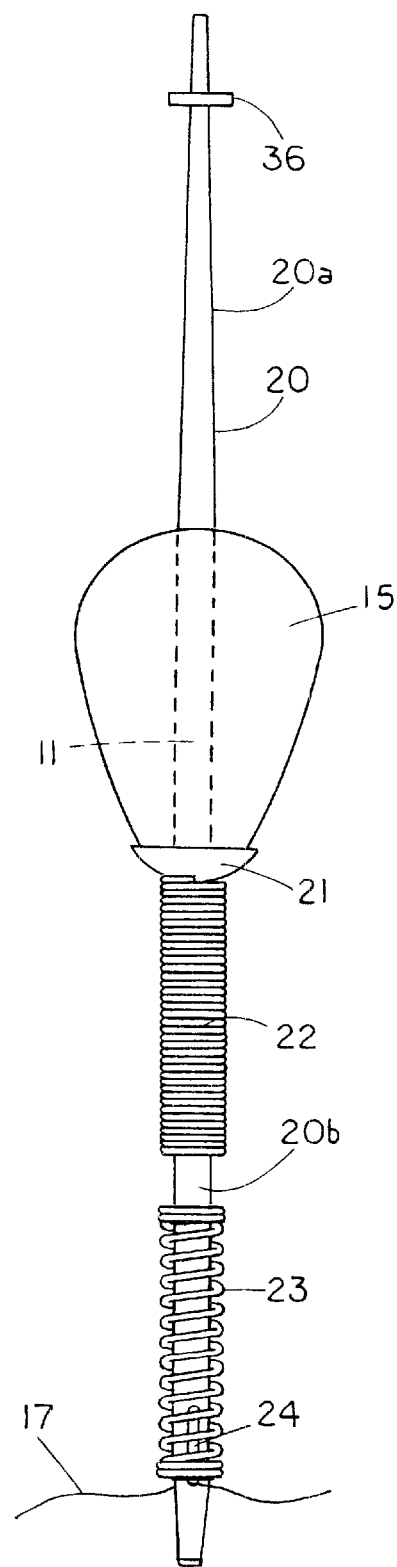

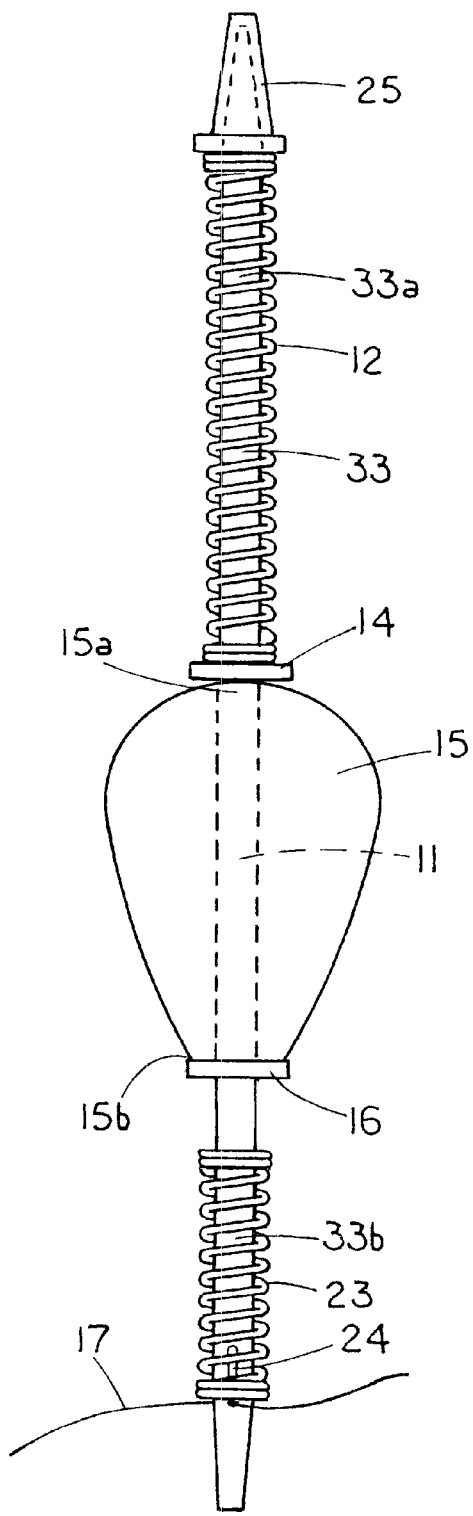
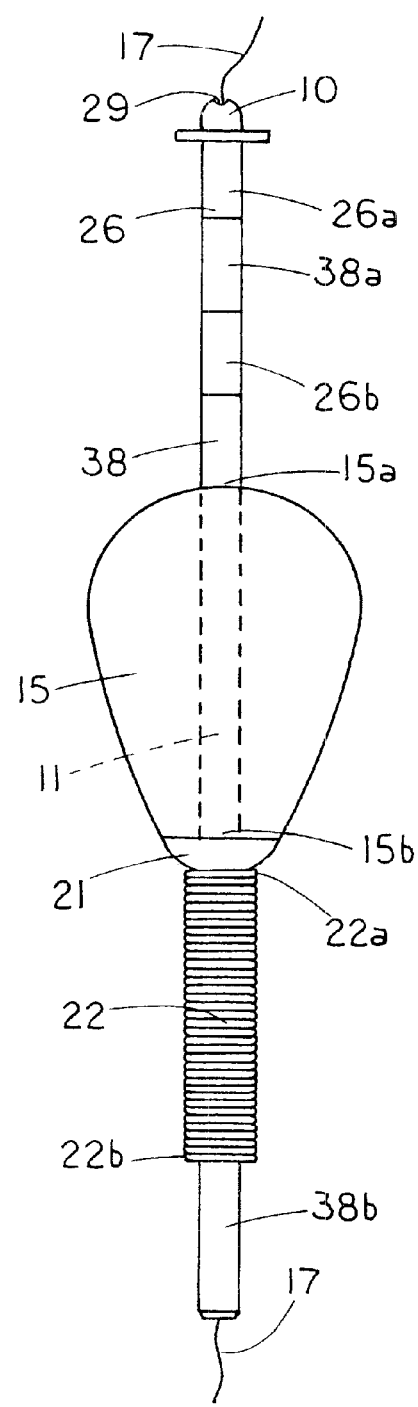

TWO-STAGE FISHING BOBBER

FIELD OF THE INVENTION

This invention relates generally to fishing, and more specifically, to a two-stage fishing bobber which either can be either used as a conventional visual indicator or as a more sensitive visual indicator to detect when a fish is nibbling on the bait.

BACKGROUND OF THE INVENTION

When fishing with a bobber, it can sometimes be difficult to determine when a fish is nibbling on the angler's line, especially in waters that have active waves or when one is fishing for passive or highly sensitive fish. Having difficulties in determining when a fish is nibbling on a line reduces the chance of an angler being able to hook and reel in the fish since premature jerking results in not hooking the fish or scareing nearby fish off.

The prior art includes bobbers with some type of spring setting action to set the hook. For example, in the embodiment shown in U.S. Pat. No. 4,359,836 the float includes a resistance body such as a flat disk that abruptly increase the drag on the line as the fish pulls on the line.

In contrast, the present invention does not provide for setting of the hook but supplies visual information to the fisherperson through a first-stage slideable rod that allows the fisherperson to visually determine if a fish is nibbling the bait by visually observing the displacement of the slideable rod with respect to a bobber main body but before visual displacement of the bobber main body can be visually detected. The second-stage permits anglers to fish in a conventional manner as visual information is provided by submersion of both the slideable rod and the bobber main body.

DESCRIPTION OF THE PRIOR ART

U.S. Pat. No. 4,359,836 discloses a fishing float with a resistance member that enables a hook to jerk and hook fishes.

U.S. Pat. No. 1,982,573 discloses a fishing bobber with a hollow core and U.S. Pat. No. 5,117,576 discloses a fishing bobber with an adjustable brake.

U.S. Pat. No. 5,608,985 discloses a mechanism for securing bobbers to a fishing line.

U.S. Pat. No. 2,609,634 discloses a bobber that can be set at variable depths.

U.S. Pat. No. 2,509,704 discloses a combined float and casting weight with an internal spring which helps to hold the bobber while casting.

U.S. Pat. Nos. 2,631,399 and 2,712,194 discloses fishing devices comprising a bobber with a spring to hook fish as they bite.

SUMMARY OF THE INVENTION

Briefly, the present invention comprises a two-stage fishing bobber with a main body carrying a first-stage free sliding retractable rod having a fishing line engaging member with part of the free sliding retractable rod extending sufficiently above the main body to enable a fisherperson to keep visual track of the displacement of the free sliding retractable rod with respect to the main body. When fishing for large or aggressive fishes, the second stage of the two-stage bobber is used as a conventional fishing bobber which is submerged as the fish pulls on the line. When fishing for smaller, passive or sensitive fishes, the two-stage bobber can be used as a sensitive detection device as only a slight pull on the line produces a depression of the free sliding rod with respect to the bobber main body to allow a fisherperson to visually detect when a fish is nibbling on the bait well before the main body is visually detectable as being displaceable with respect to the body of water.

BRIEF DESCRIPTION OF THE DRAWINGS

FIG. 2 shows a side view of the two-stage bobber of FIG. 1 having a fishing line running through the free sliding hollow center tube with the two stage bobber resting in a body of water with the tube in an upward position;

FIG. 3 shows the same side view of FIG. 2 of the two-stage bobber resting in a body of water but with the free sliding hollow center tube being depressed downward compressing the spring;

FIG. 4 is similar to FIG. 2 showing hollow tube in the up position on the bobber main body after fish relieves a pull on a fishing line;

FIG. 5 shows a side view of a two-stage bobber with springs encircling the upper and the lower ends of a hollow rod;

FIG. 6 shows a side view of a two-stage bobber with a solid rod having a restoring spring and a line retaing spring encircling the lower end of the rod;

FIG. 7 shows a side view of a two-stage bobber with a return spring on one end of a solid rod and a line retaining spring on the other end of the rod;

FIG. 8 shows a side view of a two-stage bobber with a spring attached to one end of a rod with the other end containing a set of colored bands;

DESCRIPTION OF THE PREFERRED EMBODIMENT

Figure 1:
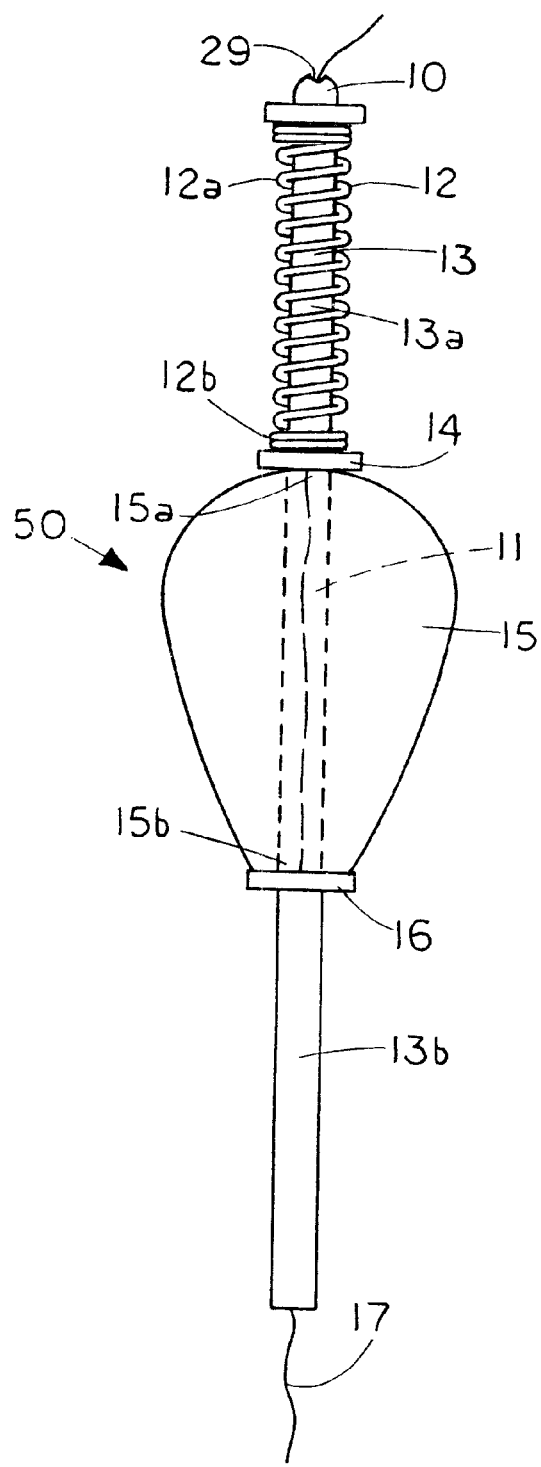
FIG. 1 shows a side view of a two-stage bobber with a spring and a free sliding hollow rod therein.

Referring to FIG. 1, the reference numeral 50 identifies a two-stage bobber. Reference numeral 15 represents a bobber main body which is eithere made from a buoyant lightweight material or contains a hollow therin that permits the bobber main body to float in a body of water. Bobber main body 15 has a cavity 11 running through a vertical float axis of bobber main body 15. By vertical float axis it is meant that the body has a preferred flotation position with the vertical float axis corresponding to a vertical. Passing through cavity 11 of bobber main body 15 is a free sliding rod comprising a hollow tube 13 having an upper end 13a and a lower end 13b. The length of free sliding tube 13 is longer than the length of bobber main body 15, sufficiently longer to allow a user to view upper end 13a of tube 13 from a distance when tube 13 is in cavity 11 of bobber main body 15. Upper end 13a of hollow tube 13 is encircled with a compression spring 12 in an uncompressed condition, having a first end 12a and a second end 12b. Attached to the tip of upper end 13a of tube 13 is stop cap 10 which keeps compression spring 12 from sliding off of tube 13 and at the lower end of spring 12 is a free sliding washer 14 that supports the lower end 12b of spring 12 with respect to bobber main body 15. At the center of stop cap 10 is a fishing line engaging member 29 comprising a small hole which allows for an unknotted fishing line to run therethrough.

At the lower end of slideable rod 13 is a fixed stop 16 which is securely attached to tube 13 and prevents free sliding hollow tube 13 from sliding upward out of bobber main body 15.

At the upper end of bobber main body 15 free sliding washer 14 contains an opening sufficiently large to allow free sliding of rod 13 therethrough. Spring 12 is shown positioned between stop cap 10 and free sliding washer 14 so that a downward pull by a fish on a line 17 displaces free sliding tube 13 and compresses spring 12 with respect to bobber main body 15 without submerging the upper end of bobber main body 15. That is, the resistance to depression of center rod 13 with respect to bobber main body 15 is sufficiently less than the buoyant force provided by bobber main body 15. Consequently, while a fish pulling on line 17 might not produce sufficient displacement of bobber main body 15 to alert a fisherperson to the presence of a fish on the line the first-stage more sensitive rod 13 can by the displacement of the center tube 13 with respect to the bobber main body 15 to thereby provide a visual indication to the fisherperson of the presence of a fish on the line 17.

Figure 1A:
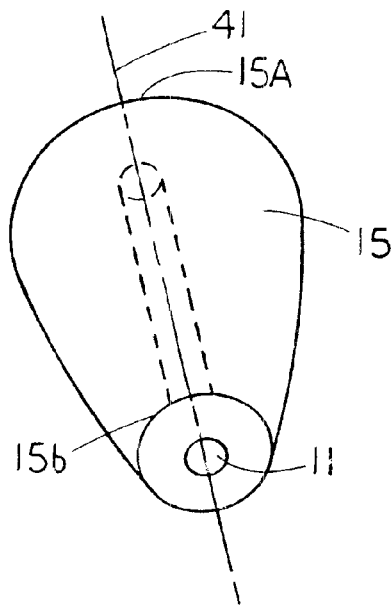
FIG. 1a shows a perspective view of a two-stage bobber main body showing the bottom end with a cavity.

FIG. 1a is a perspective view of bobber main body 15 and lower end 15b of bobber main body 15 showing cavity 11 (dotted lines) extending through bobber main body 15. Cavity 11 is located at the center of bobber main body 15 and runs through bobber main body vertical float axis 41. The diameter of cavity 11 is larger than the diameter of free sliding tube 13, sufficiently larger to allow tube 13 to freely slide in cavity 11.

Referring to FIG. 2 the two-stage bobber of FIG. 2 is identical to the two-stage bobber of FIG. 1 except that the bobber main body 15 is resting partially below and partially above water surface 18 with fishing line 17 running through the free sliding center tube 13. Lower end 15b of bobber main body 15 is submerged under water surface 18 while upper end 15 of bobber main body 15, is in the up position, hovering above water surface 18. Spring 12 is in uncompressed state thus keeping tube 13 in an up position by pushing upward on stop cap 10 which is connected to tube 13. The length of fishing line 17 is set by creating a knot 30 on line 17 where the diameter of knot 30 is larger than the diameter of an opening in fishing line engaging member 29, so that knot 30 will block further line from going through the opening in fishing line engaging member 29.

FIG. 3 is similar to FIG. 2 except that a fish 19 is shown pulling on line 17 causing free sliding tube 13 to be displaced downward to the down position, a distance denoted by "x" from the up position, which results in spring 12 being compressed. During this event, the fisherperson is able to visually detect that fish 19 is nibbling on the bait by displacement of tube 13 with respect to bobber main body 15 even though the vertical displacement of the bobber main body 15 with respect to the water surface 18 may not be visually detectable by a fisherperson.

Refer to FIG. 4, which is identical to FIG. 2 except for the lack of fish 19 on line 17. After fish 19 has stopped nibbling the bait, there is no further pull on line 17 which results in spring 12 pushing free sliding tube 13 from the down position back to the up position where once again a fisherperson is in a position to determine if another fish starts to nibble on the bait. Fixed stop 16, which is securely attached to tube 13, halts hollow tube 13 upward slide as hollow tube 13 is forced back to the up position, by engaging the lower end of bobber main body 15 thus demonstrating the restoring capability of the two-stage bobber.

Thus in operation of the two-stage bobber although tube 13 moves downward a distance "x" during a fish's pull on line 17 bobber main body 15 only moves downward a distance "y" during the entire event. Since the distance that tube 13 moves, "x" is significantly greater than the distance that bobber main body 15 moves, "y". The movement of bobber main body 15 is not significantly different so that a fisherperson would visually notice.

Bobber main body 15 is made from buoyant material and can be made in different sizes or different shapes to provide different resistance to submersion of bobber main body 15. Similarly, spring 12 can be provided with different spring constants so that the resistance of depression of tube 13 can be changed. However, in order to provide the two-stage fishing bobber of the present invention the force required to depress spring 12 is sufficiently less than the force required to submerge the bobber main body 15. Thus the bobber main body 15 should be sufficiently buoyant to support upper end 15a of bobber main body 15 from being submerged by displacement "x" of line 17 by fish 9. As for the movement of rod 13, the relative displacement of rod 13 with respect to bobber main body 15 visually alerts the fisherperson since the distance of downward movement of slideable rod 13 is significant enough to be distinguishable to the fisherperson while bobber main body displacement may not be significant enough to be distinguishable to the fisherperson.

The use of spring for returning the slideable rod 13 to the up position provides a further benefit in that the spring can indicate the relative force of the fish on the fishing line. That is, if the fish nibbles only lightly the slideable rod 13 may be depressed only partially down but if a fish bites harder the slideable rod 13 may be depressed all the way to the down condition shown in FIG. 3.

FIG. 5 shows an alternate embodiment with bobber main body 15 having hollow rod 13 extending through cavity 11 of bobber main body 15. Located at upper end 13a of rod 13 is stop cap 10. Located at lower end 13b of rod 13 is a fixed stop 16. Located at the upper end 15a and lower end 15b of bobber main body are free sliding washers 14a and 14b. Located between free sliding washer 14a and stop cap 10 is compression spring 12 for returning rod 13 to the normally up position. Located on the lower portion of rod 13b between free sliding washer 14b and fixed stop 16 is a compression spring 12 that acts as a shock absorber to absorb forces as free sliding rod 13 returns to the up position and thus allow rod 13 to more quickly return to a fixed upward displacement with respect to bobber main body 15.

FIG. 6 shows a further alternative embodiment with a solid centered rod 20, having a tapered upper end 20a, going through cavity 11 of bobber main body 15. Located at upper end 20a of rod 20 is fixed stop 36 whose purpose is to prevent rod 20 from moving downward through bobber man body 15. Encircling the lower end of rod 20 is an extension spring 22 which returns rod 20 to the up position when rod 20 is depressed and a line engaging spring 23 which also encircles fishing line engaging member 24 and locks fishing line 17 to engaging member 24. Connecting the lower end of bobber main body 15 and one end of extension spring 22 is concave washer 21 which is secured to the lower end of bobber main body 15. In operation of the embodiment of FIG. 6 the rod 20 is displaced downward by a fish pulling on line 17. In this embodiment, the resistance of the downward displacement of rod 20 is obtained by the extension of spring 22. That is one end of spring 22 is secured to washer 21 and the other end of spring 22 is secured to rod 20b so that extension or tension spring extends as rod 20 is displaced downward with respect to main body 15. If a fish releases the hook the tension spring 22 returns the rod 20 to the up position shown in FIG. 6.

FIG. 7 shows a further alternate embodiment of the invention with bobber main body 15 having a solid cylindrical center tube 33 slideable displaceable through cavity 11 of bobber main body 15. Attached to and covering the tip of upper end of rod 33a is stop cap 25. At upper end 15a of bobber main body 15 is free sliding washer 14 with respect to rod 33. Between free sliding washer 14 and stop cap 25 is compression spring 12. Located at lower end 15b of bobber main body 15 is fixed stop 16 which is securely fixed to rod 33. Encircling lower end 33b of rod 33 is line engaging spring 23 which also is encircling fishing line engaging member 24. The purpose of line engaging spring 23 is to help attach a fishing line 17 to rod 33 by locking fishing line 17 to a fishing line engaging member 24. The operation of the embodiment of FIG. 7 is identical to the operation of the embodiment of FIG. 1 except that instead of having line 17 pass through the center of the retractable rod, line 17 is attached to the bottom portion 23b.

FIG. 8 shows an embodiment wherein hollow rod 38, has a set of brightly colored contrasting bands 26a and 26b on upper end 38a of rod 38 which extends through cavity 11 of a bobber main body 15. At the tip of upper end 38a of rod 38 is stop cap 10 having fishing line engaging member 29 at stop cap 10 center. Encircling lower end 38B of hollow rod 38 is extension spring 22 which is securely attached to rod 38 at 22b. Connecting extension spring 22 to lower end 15b of bobber main body 15 is concave washer 21 which is securely attached to spring 22 at spring end 22a. The operation of the embodiment of FIG. 8 is such that a downward pull on rod 38 by line 17 will result in upper end 38a of rod 38 being displaced downward causing spring 22 to extend. Relief of the downward pull on rod 38 results in spring 22 pulling rod 38 back to the up position. By including brightly colored bands 26a and 26b on hollow rod 38 it allows for easier visual detection of displacement of rod 38 with respect to bobber main body 15. That is, a fisherperson at a distance can in some circumstances more quickly notice the displacement or disappearance of one or the colored bands in the main bobber body than the relative displacement of the fishing rod 38a extending above the bobber main body 15.

Figure 9:
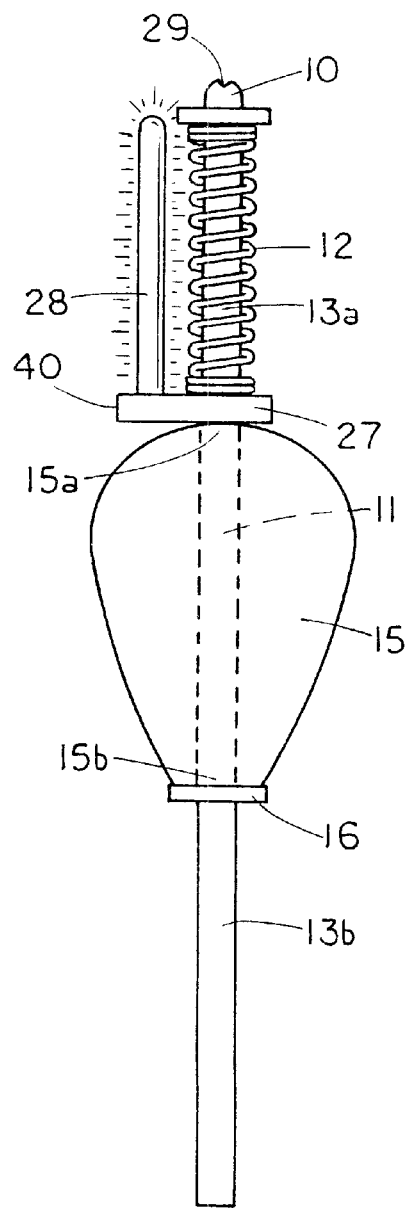
FIG. 9 is similar to FIG. 2 with the two-stage bobber including a light capsule holder holding a light capsule therein.

FIG. 9 is similar to FIG. 1 except that located on upper end 13a of hollow rod 13 between compression spring 12 and upper end 15a of bobber main body 15 is free sliding washer 27 which is attached to a resilient chemiluminescence capsule holding device 40 holding a chemiluminescence capsule 28. When spring 12 is compressed, rod 13 is displaced downward but chemiluminescence capsule 28 remain in position. The chemiluminescence capsule holding device 40 and chemiluminescence capsule 28 allows user to know where a bobber main body 15 is submerged or it allows the anglers to detect when a fish is biting in dark conditions by displacement of rod 13 with respect to the chemiluminescence capsule 28.

Figure 10:
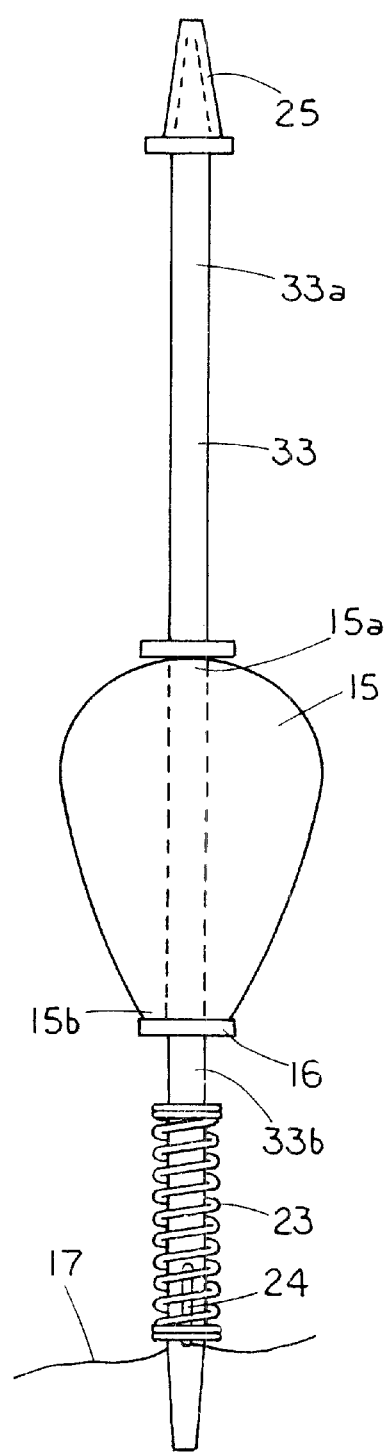
FIG. 10 shows a two-stage bobber with a free sliding solid center rod having a stop cap and a fixed stop with a line retainingn spring encircling the lower end of the rod.

FIG. 10 shows a further embodiment of the invention including a bobber main body 15 with a free sliding center rod 33 extending through cavity 11 of bobber main body 15. Rod 33 is made from a buoyant material to provide a buoyant force to normally maintain rod 33 in the up position as shown in FIG. 10. Covering the tip of upper end of rod 33a is stop cap 25. Stop cap 25 prevents rod 33 from sliding through bobber main body 15. Located at lower end 15a of bobber main body 15 is fixed stop 16 which is securely fixed to rod 33. Fixed stop 16 prevents rod 33 from sliding out of bobber main body 15. Encircling lower end 33b of rod 33 is line engaging spring 23 which also is encircling fishing line engaging member 24. The purpose of spring 23 is to help attach a fishing line 17 by locking fishing line 17 to a fishing line engaging member 24.

In operation of the embodiment of FIG. 10 a downward pull from a fish on line 17 results in a downward displacement of rod 33 until upper end 15a of bobber main body 15 meets stop 25 which halts any further movement of rod 33. That is, the buoyant force of rod 33 maintains rod 33 in the up position but the downward pull on line 17 causes rod 33 to be displaced with respect to bobber main body 15. Once the downward pull on line 17 has been relieved, the buoyancy force on rod 33 causes rod 33 to move upward to the up position where lower end 15a of bobber main body 15 meets fixed stop 16 which halts any further upward movement by rod 33. In this embodiment the restoring force for the rod 33 is provided by the buoyancy of rod 33 rather than by a spring.

Thus it will be appreciated that the present invention comprises a bobber main body having an upper end and a lower end with the bobber main body normally buoyable in an upright postion in a body of water. The bobber main body having an opening extending along a vertical float axis. A slideable rod is slidably positioned in the cavity of the bobber main body. The slideable rod supports a fishing line thereon with the slideable rod normally resiliently maintained in the bobber main body in an up position but downwardly displaceable with respect to the bobber main body in response to a first force on the fishing line which is sufficient to displace the slideable rod with respect to the bobber main body but not sufficient for a viewer to discern the displacement of the bobber main body with respect to the body of water. This action provides a first-stage visually indication. The bobber main body and the slideable rod are both displaceable into the body of water in response to a second force which is larger than the first force to provide a second-stage visual indication.

While the amount of relative displacement of the slideable rod with respect to the main bobber body can vary the amount of displacement should be sufficient so that a person can readily detect the displacement of the slideable rod with respect to the bobber main body. In some instance a displacement of the rod at least twice the displacement of the bobber main body is sufficient, however, in other cases the user may want greater displacement of the slideable rod with respect to the bobber main body.

While the present invention has been shown with free sliding washers supporting the tube the free sliding washers are provided for support of the spring and, if desired, could be eliminated.

It should be pointed out that the present invention is minnow friendly. That is the minnows normally swim actively when placed on a hook in the water particularly when they are attached to a conventional fishing bobber that maintains a stiff resistance to minnow activity. This causes the minnow to quickly tire out and the minnow soon ceases activity and becomes less desirable as bait. With the capability of the bobber to provide a light resistance as well as a gradual resistance the minnow can maintain activity for a greater time. That is, because the bobber force to the minnow is lighter or more gradual the minnow can maintain activity for a longer time.

A further advantage of the present invention is that the two-stage fishing bobber offers a gradual resistance to a fish biting on the line. As a result the fish does not notice the sharp resistance of the bobber as the bobber is submerged and is less likely to spit out the bait. That is instead of the fish facing an abrupt jerk on the line by submerging the bobber the fish receives a gradual pull on the line as the spring is compressed and then a further tug as the bobber is submerged. However, since there is already a resistance on the line from compressing the spring the submersion of the bobber does not produce a sharp increase in the force which might cause the fish to spit out the hook.

I claim:

1. A two-stage fishing bobber comprising:
    a bobber main body having an upper end and a lower end, said bobber main body made from a buoyant lightweight material to enable said bobber main body to float in a body of water, said bobber main body having a cavity running through a vertical float axis of said bobber main body;
    a hollow free sliding tube having an upper end and a lower end, said hollow free sliding tube slideably extending through the cavity of said bobber main body, with said hollow tube allowing for movement of a fishing line therethrough;
    a compression spring having a first end and a second end, encircling the upper end of said hollow free sliding tube;
    a stop cap, connected to the upper end of said hollow free sliding tube, to keep said spring encircling said hollow free sliding tube;
    a free sliding washer located around said free sliding tube and supported by said bobber main body, said compression spring positioned between said stop cap and said free sliding washer so that a downward pull by a fish on the fishing line compresses said spring to displace said free sliding tube with respect to said bobber main body without submerging said upper end of said bobber main body; and
    a fixed stop connected to said lower end of said free sliding tube to prevent said tube from sliding through said bobber main body.

2. A two-stage fishing bobber responsive to different fishing forces comprising:
    a bobber main body having an upper end and a lower end, said bobber main body normally buoyable in a body of water, said bobber main body having an opening extending through a vertical float axis of said bobber main body;
    a slideable rod, said slideable rod slidably positioned in the cavity of said bobber main body, said slideable rod supporting a fishing line thereon with said slideable rod normally resiliently maintained in said bobber main body in an up position but downwardly displaceable with respect to said bobber main body in response to a first force on the fishing line which is sufficient to displace said slideable rod with respect to said bobber main body but not sufficient for a viewer to discern the displacement of the bobber main body with respect to the body of water to thereby provide a first-stage visually indication, said bobber main body and said slideable rod both displaceable into the body of water in response to a second force larger than said first force to thereby provide a second-stage visual indication; and
    a spring for resiliently maintaining said slideable rod in an up position in said bobber main body.

3. The two-stage bobber of claim 2 wherein the displacement of said slideable rod with respect to said bobber main body is at least 2 times the displacement of the bobber main body in the body of water.

4. The two-stage bobber of claimed in claim 2 wherein said rod is buoyant for resiliently maintaining said rod in an up position in said bobber main body.

5. The two-stage bobber of claimed in claim 2 including a fixed stop on a lower end of said slideable rod to maintain said slideable rod in said bobber main body.

6. The two-stage bobber of claimed in claim 2 wherein said spring is a compression spring.

7. The two-stage bobber of claimed in claim 2 wherein said spring is a tension spring.

8. The two-stage bobber of claim 2 wherein said rod has a hollow center allowing for a fishing line to run therethrough and a fishing line engaging member having an opening which allows an unknotted fishing line to slide through but can be blocked from sliding therethrough by a knot on the fishing line.

9. The two-stage bobber of claim 2 wherein said lower end of said rod includes a compression spring to dampen upward movement of the slideable rod as the slideable rod returns to the up position.

10. The two-stage bobber of claim 2 wherein a stop cap is attached to the upper end of said rod to maintain said rod in said bobber main body so that a downward pull by a fish on the fishing line compresses said spring to displace said free moving rod with respect to said bobber main body.

11. The two-stage bobber of claim 2 wherein an upper end of said rod contains a set of brightly colored contrasting bands.

12. The two-stage bobber of claim 2 including a resilient chemiluminescence capsule holder supported by said bobber main body to provide for nighttime fishing.

13. The two-stage bobber of claim 7 wherein said spring is a tension spring.

14. A two-stage fishing bobber responsive to different fishing forces comprising:
    a bobber main body having an upper end and a lower end, said bobber main body normally buoyable in a body of water, said bobber main body having an opening extending through a vertical float axis of said bobber main body;
    a slideable rod, said slideable rod slidably positioned in the cavity of said bobber main body, said slideable rod supporting a fishing line thereon with said slideable rod normally resiliently maintained in said bobber main body in an up position but downwardly displaceable with respect to said bobber main body in response to a first force on the fishing line which is sufficient to displace said slideable rod with respect to said bobber main body but not sufficient for a viewer to discern the displacement of the bobber main body with respect to the body of water to thereby provide a first-stage visually indication, said bobber main body and said slideable rod both displaceable into the body of water in response to a second force larger than said first force to thereby provide a second-stage visual indication; and
    a stop cap located on an upper end of said slideable rod to maintain said slideable rod in said bobber main body.

15. A two-stage fishing bobber responsive to different fishing forces comprising:
    a bobber main body having an upper end and a lower end, said bobber main body normally buoyable in a body of water, said bobber main body having an opening extending through a vertical float axis of said bobber main body;

a slideable rod, said slideable rod slidably positioned in the cavity of said bobber main body, said slideable rod having a solid center, said slideable rod supporting a fishing line thereon with said slideable rod normally resiliently maintained in said bobber main body in an up position but downwardly displaceable with respect to said bobber main body in response to a first force on the fishing line which is sufficient to displace said slideable rod with respect to said bobber main body but not sufficient for a viewer to discern the displacement of the bobber main body with respect to the body of water to thereby provide a first-stage visually indication, said bobber main body and said slideable rod both displaceable into the body of water in response to a second force larger than said first force to thereby provide a second-stage visual indication; and a member for engaging a fishing line, said member located on a lower end of said rod, said member having a slit with a spring encircling the slit to lock the fishing line therein.

16. A two-stage fishing bobber responsive to different fishing forces comprising:

a bobber main body having an upper end and a lower end, said bobber main body normally buoyable in a body of water, said bobber main body having an opening extending through a vertical float axis of said bobber main body;

a slideable rod, said slideable rod slidably positioned the cavity of said bobber main body, said slideable rod supporting a fishing line thereon with said slideable rod normally resiliently maintained in said bobber main body in response to a first force on fishing line which is sufficient to displace said slideable rod with respect to said bobber main body to thereby provide a first-stage visually indication, said bobber main body and said slideable rod both displaceable into the body of water in response to at second force larger than said first force to thereby provide a second-stage visual indication; and a spring for resiliently maintaining said slideable rod in an up position in said bobber main body.

* * * * *